(12) United States Patent
Kim

(10) Patent No.: US 7,398,536 B2
(45) Date of Patent: Jul. 8, 2008

(54) OPTICAL DISK DRIVE

(75) Inventor: Sang-tae Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 490 days.

(21) Appl. No.: 10/753,346

(22) Filed: Jan. 9, 2004

(65) Prior Publication Data

US 2004/0143837 A1 Jul. 22, 2004

(30) Foreign Application Priority Data

Jan. 14, 2003 (KR) .................. 10-2003-0002376

(51) Int. Cl.
*G11B 17/03* (2006.01)

(52) U.S. Cl. .................................... 720/611

(58) Field of Classification Search ................ 720/611, 720/600, 607, 613; 369/75.2
See application file for complete search history.

(56) References Cited

U.S. PATENT DOCUMENTS

| | | | | |
|---|---|---|---|---|
| 5,467,333 A | * | 11/1995 | Ji | 720/607 |
| 5,555,227 A | | 9/1996 | Kurosu | |
| 5,959,956 A | * | 9/1999 | Takishima | 720/607 |
| 6,151,285 A | * | 11/2000 | Watanabe et al. | 720/610 |
| 6,345,027 B1 | * | 2/2002 | Saji et al. | 720/607 |
| 6,590,849 B1 | * | 7/2003 | Yamauchi et al. | 720/607 |
| 2003/0117928 A1 | * | 6/2003 | Choi et al. | 369/75.2 |

FOREIGN PATENT DOCUMENTS

| | | |
|---|---|---|
| CN | 1099182 | 2/1995 |
| CN | 1099182 A | 2/1995 |
| JP | 06-103672 | 4/1994 |
| JP | 2002-230955 | 8/2002 |
| KR | 1999-35862 | 9/1999 |
| KR | 2002-69547 | 5/2002 |
| KR | 2002-81813 | 10/2002 |

OTHER PUBLICATIONS

Notice to Submit Response for corresponding Korean Application No. 2003-2376 dated Feb. 25, 2005.
Chinese Office Action dated May 11, 2007.

* cited by examiner

*Primary Examiner*—Tianjie Chen
(74) *Attorney, Agent, or Firm*—Staas & Halsey LLP

(57) ABSTRACT

An optical disk drive includes a main body including a spindle motor to rotate a disk and an optical pickup to access the disk, a tray installed on the main body to be loaded and unloaded, and a compression member, which is disposed on the main body, for preventing vibrations of the tray, when the tray loads into and unloads from the main body, by applying an elastic force to a side surface of the tray in a horizontal direction.

3 Claims, 8 Drawing Sheets

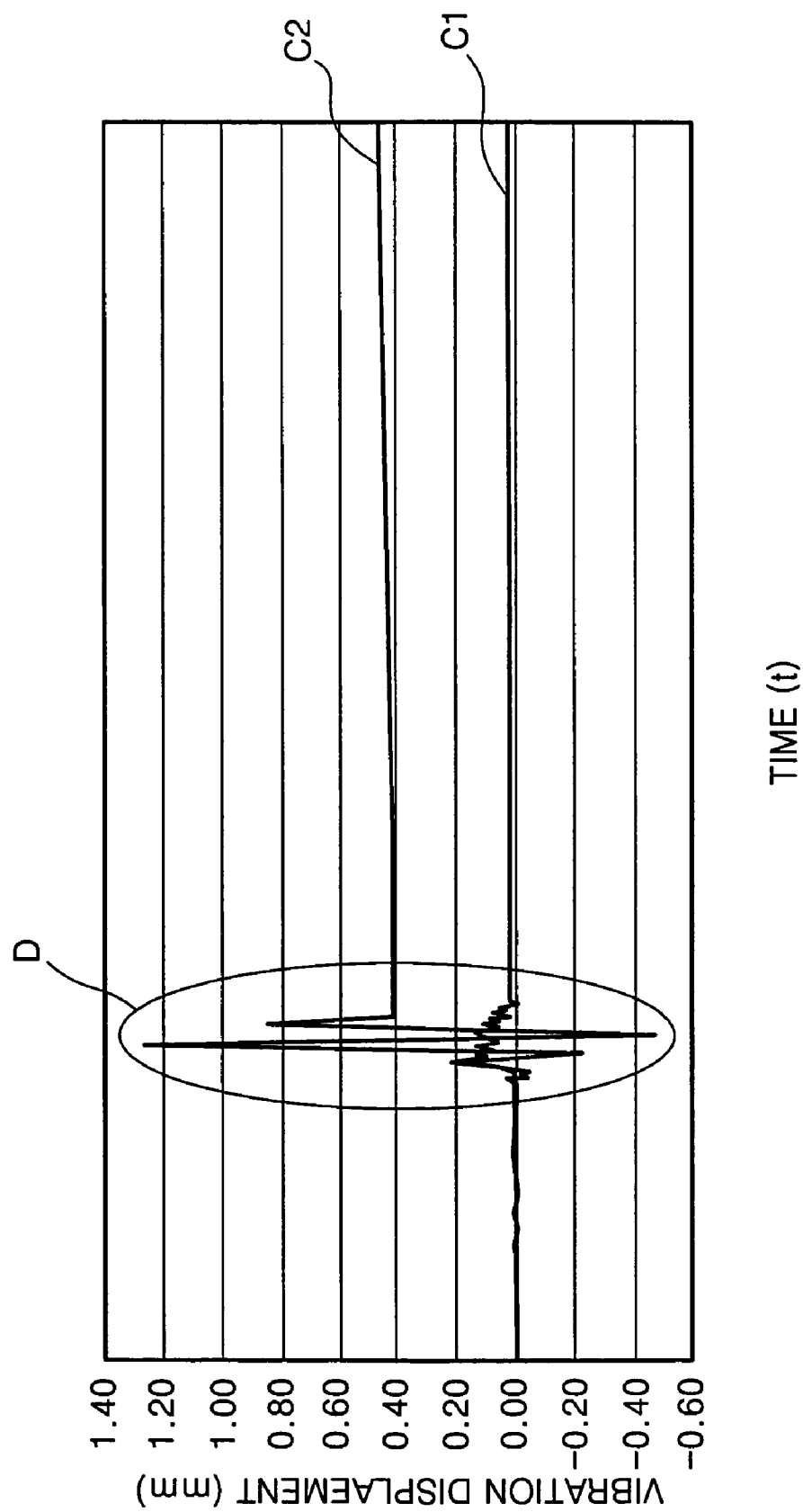

OPTICAL DISK DRIVE

CROSS-REFERENCE TO RELATED APPLICATIONS

This application claims the benefit of Korean Patent Application No. 2003-2376, filed on Jan. 14, 2003, in the Korean Intellectual Property Office, the disclosure of which is incorporated herein by reference.

BACKGROUND OF THE INVENTION

1. Field of the Invention

The present invention relates to an optical disk drive, and more particularly, to an optical disk drive including a tray, which slidably loads into and unloads from a main body of the optical disk drive.

2. Description of the Related Art

In general, an optical disk drive is a device for recording/reading data by irradiating light to a recording surface of a rotating optical disk.

FIG. 1 illustrates a conventional optical disk drive, and FIG. 2 is a cross-sectional view along line I-I' of FIG. 1.

In FIGS. 1 and 2, the conventional optical disk drive includes a main frame 10, a tray 20, and a deck portion 30.

The main frame 10 includes a pair of rails 11 for guiding a sliding operation of the tray 20. The rails 11 are installed integrally with the main frame 10. Also, the main frame 10 includes a loading motor 13, which provides driving power to slide the tray 20, and a pinion gear 14, which is operated by the loading motor 13.

The tray 20 includes a mounting surface 21, on which a disk (not shown) is mounted, and a rack gear 22, which is connected to the pinion gear 14, on a lower surface of the tray 20.

A deck portion 30 includes a spindle motor 31 which rotates the disk, and an optical pickup 32 accessing the disk by sliding in a radial direction of the disk. The deck portion 30 is installed on the main frame 10, and rises toward the lower surface of the disk when the tray 20 is loaded by the operation of a cam (not shown), which is connected to the loading motor 13, and descends when the tray is unloaded.

When the disk is to be loaded, the disk is mounted on the mounting surface 21 of the tray 20, and the loading motor 13 is rotated. Then, the pinion gear 14 rotates, and the rotary force of the pinion gear 14 is transmitted to the rack gear 22 to slide the tray 20. While the tray 20 is loading, the deck portion 30 rises, and when the loading of the tray 20 is completed, the disk is mounted on a turntable 33, which is coupled to a rotary shaft of the spindle motor 31. The unloading operation of the disk is made by performing the above processes inversely.

The tray 20 is guided by rails 11 while being loaded into the main body 10. As shown in FIG. 2, recesses 23 are disposed on both edges of the tray 20 to be coupled to the rails 11. In order to slide the tray 20 along the rails 11, there should be a tolerance between each rail 11 and each recess 23. Thus, a width (W1) of the recess 23 is larger than the width (W2) of the rail 11, and a distance (W3) between the recesses 23 is larger than the distance (W4) between the rails 11.

The distances between the recesses 23 and the rails 11 should be controlled accurately for sliding the tray 20 smoothly. Otherwise, the tray 20 may vibrate or slant toward one side in sliding operation, thus increasing the loads of the loading motor 14. Also, since the distance between the pinion gear 14 and the rack gear 22 increases due to the tolerances between the recesses 23 and the rails 11, the pinion gear 14 and the rack gear 22 may not engage smoothly.

The main frame and the tray are generally fabricated in an injection molding method for mass production, however, widths W1, W2, W3, and W4 may vary depending on the molding conditions. Therefore, it is difficult to control the distances precisely.

SUMMARY OF THE INVENTION

Accordingly, it is an aspect of the present invention to provide an optical disk drive, in which a tray can be loaded and unloaded smoothly regardless of a separation between a recess and a rail.

Additional aspects and/or advantages of the invention will be set forth in part in the description which follows and, in part, will be obvious from the description, or may be learned by practice of the invention.

The foregoing and/or other aspects of the present invention are achieved by providing an optical disk drive comprising a main body including a spindle motor to rotate a disk and an optical pickup to access the disk, a tray installed to be loaded in and unloaded from the main body, and a compression member disposed on the main body to apply an elastic force to a side surface of the tray in a horizontal direction, the compression member preventing vibrations of the tray when the tray is loaded in and unloaded from the main body.

It is another aspect of the present invention to provide an optical disk drive comprising a frame including rails, a tray installed on the frame to slide along the rails, and a compression member disposed on the frame, preventing vibrations of the tray when the tray slides along the rails, by applying an elastic force to a side surface of the tray in a direction perpendicular to a sliding direction of the tray.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 8 is a graph of tray vibration measurements in the optical disk drive shown of FIG. 3.

DETAILED DESCRIPTION OF THE PREFERRED EMBODIMENTS

Figure 1:
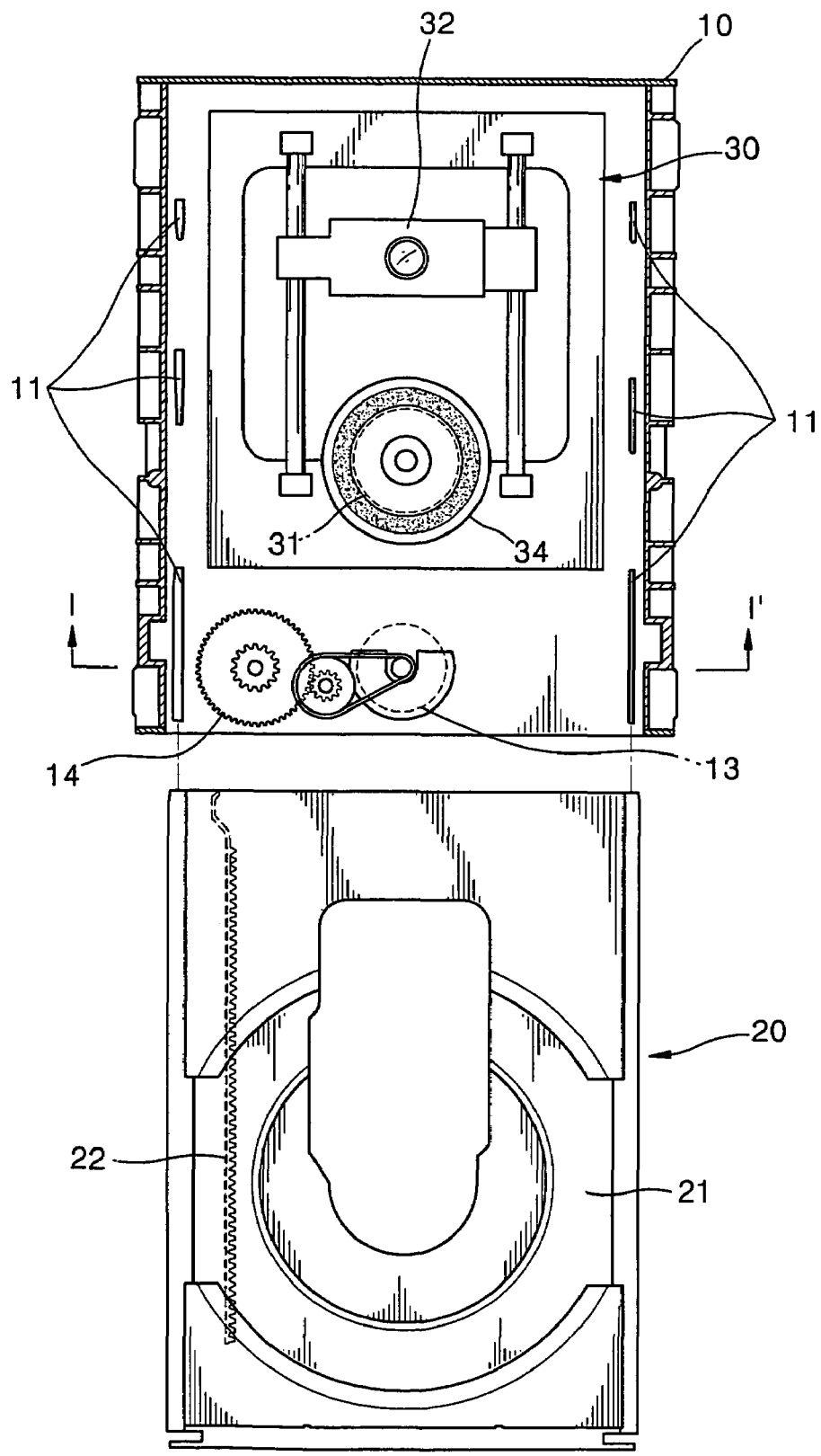
FIG. 1 is a plane view of a conventional optical disk drive.
Figure 2:
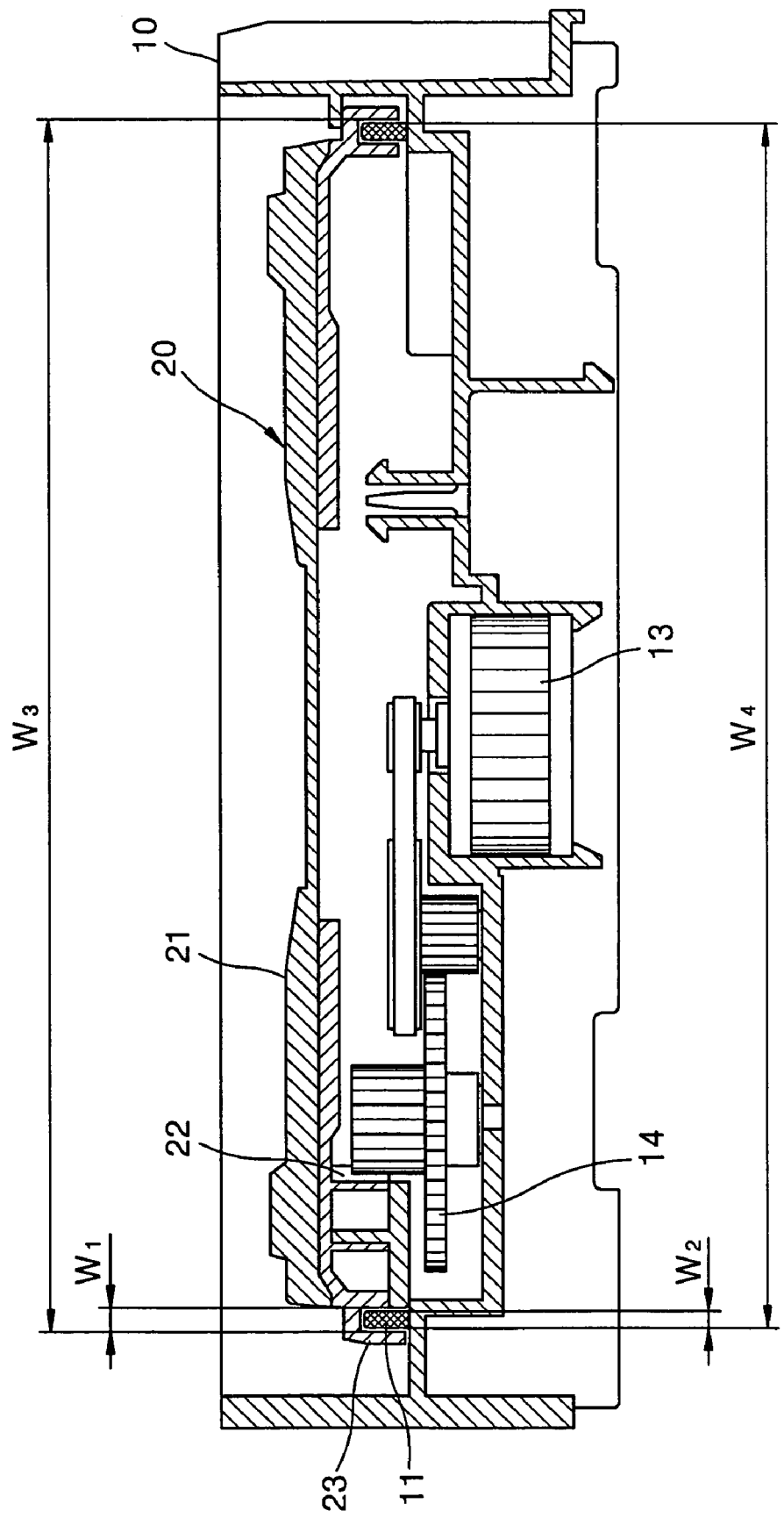
FIG. 2 is a cross-sectional view along line I-I' of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
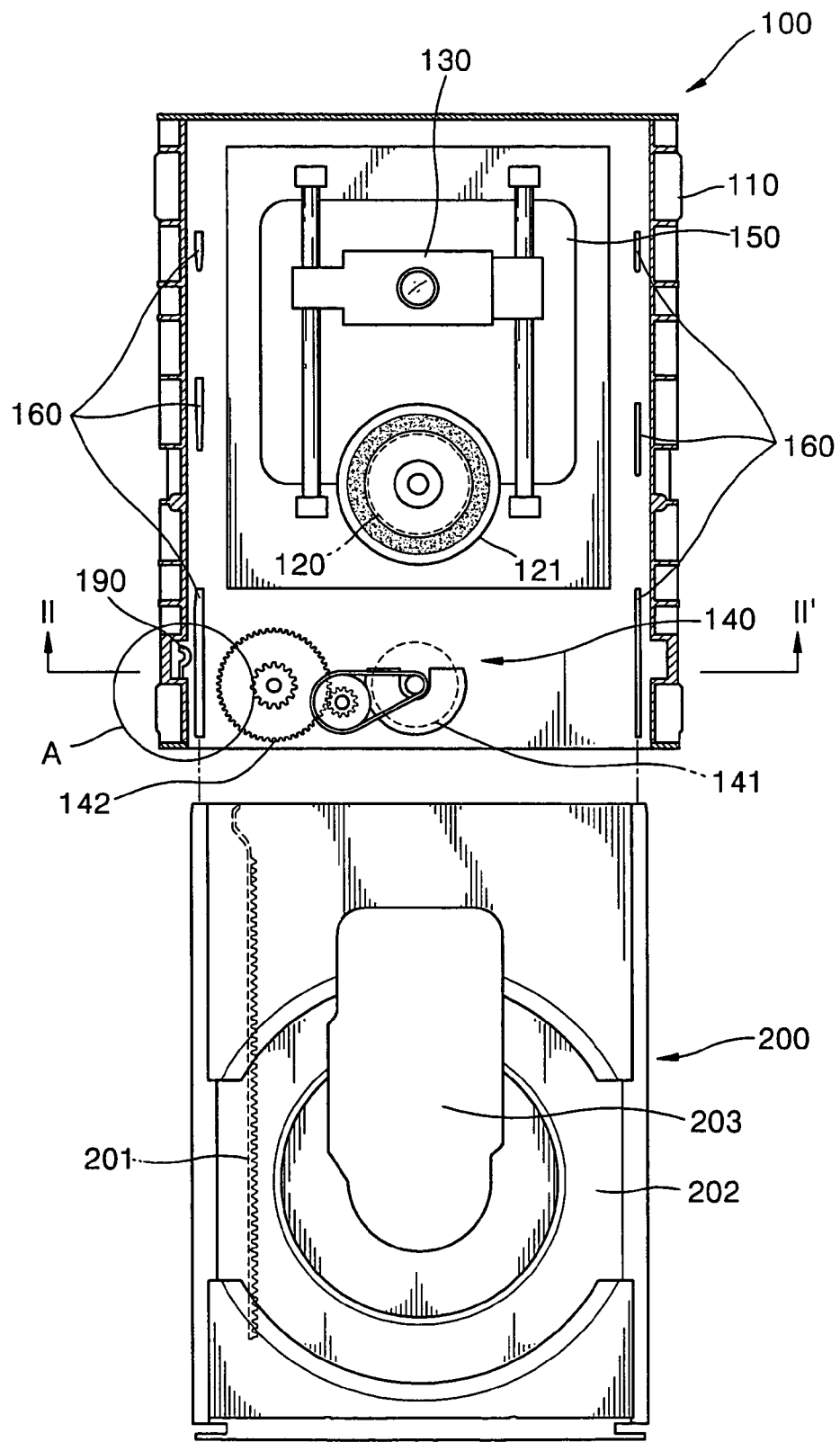
FIG. 3 is a plane view of an optical disk drive according to an embodiment of the present invention.
Figure 4:
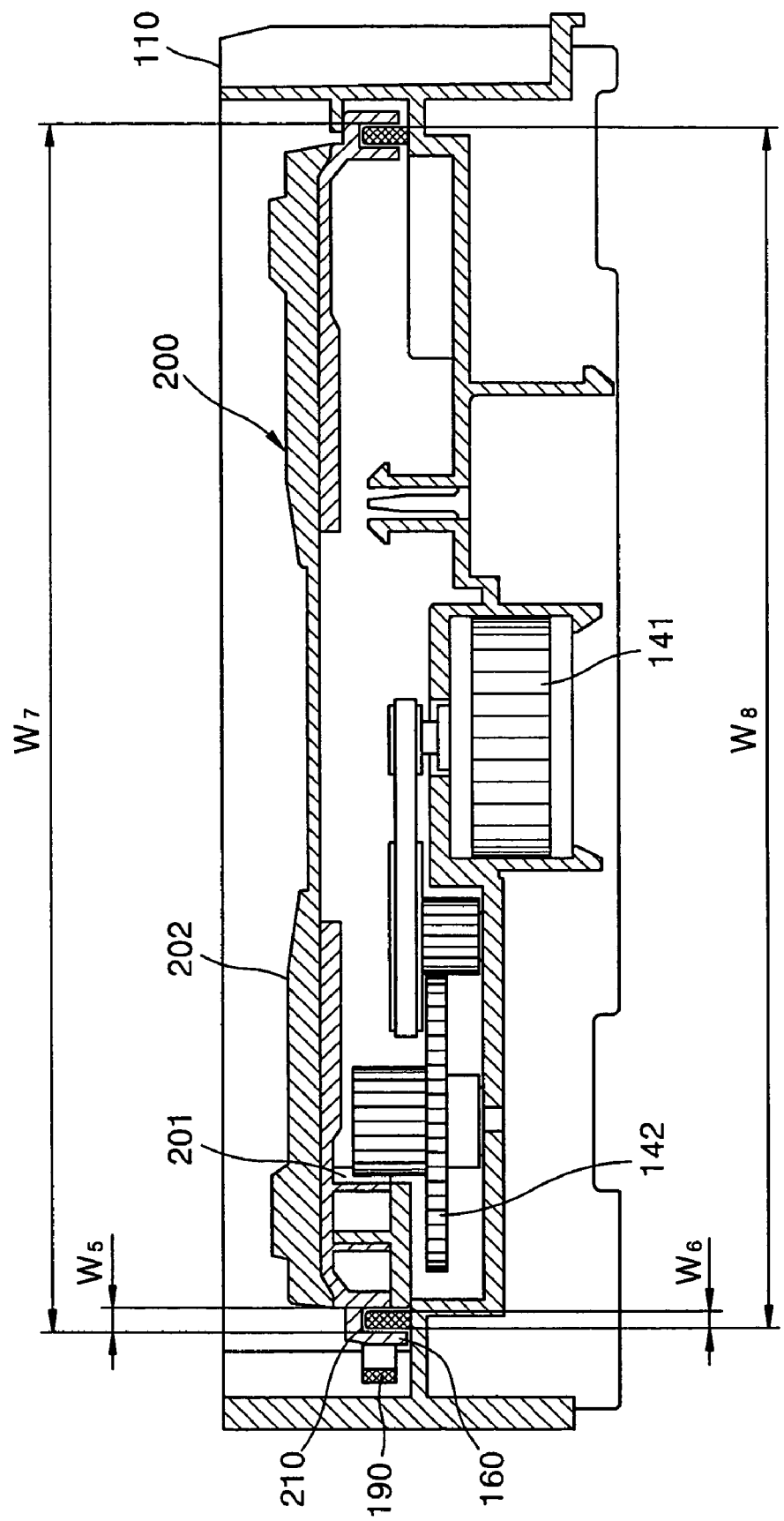
FIG. 4 is a cross-sectional view along line II-II' of FIG. 3.
Figure 5:
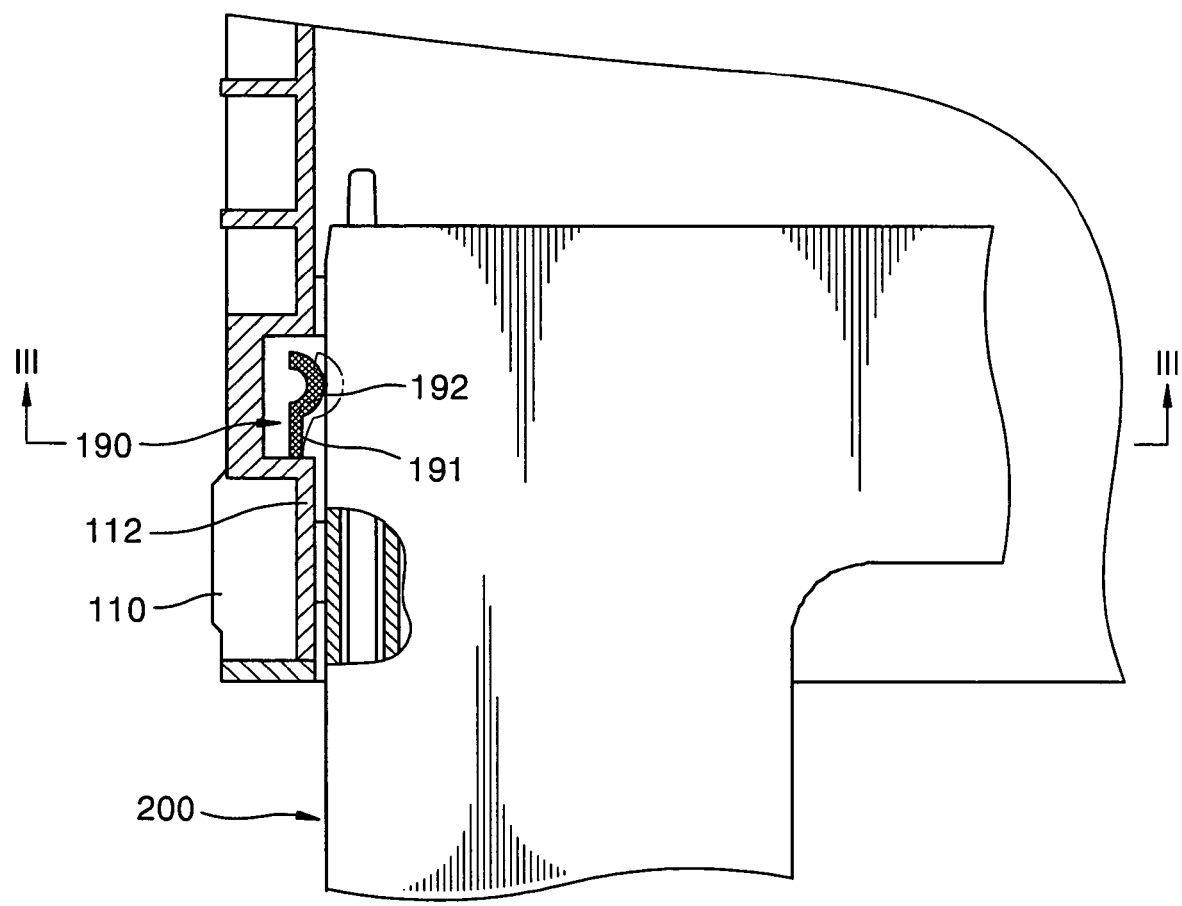
FIG. 5 is a detailed view of part A of FIG. 3.

FIG. 3 is a plane view of an optical disk drive according to an embodiment of the present invention, FIG. 4 is a cross-sectional view along line II-II', and FIG. 5 is a detailed view of part A shown in FIG. 3.

Referring to FIG. 3, a main body 100 of the optical disk drive includes a frame 110, a spindle motor 120, an optical pickup 130, and a loading unit 140. A tray 200 is installed to be loaded in and unloaded from the main body 100.

The spindle motor 120 which rotates a disk (not shown), and a turntable 121, on which the disk is mounted, is coupled to a rotary shaft of the spindle motor 120. The optical pickup 130 accesses the rotating disk to record and/or reproduce information thereon, and slides in a radial direction of the disk. The spindle motor 120 and the optical pickup 130 move in an up-and-down direction to prevent interference with the tray 200 and the disk, when the tray 200 is loaded/unloaded. Therefore, the spindle motor 120 and the optical pickup 130 are installed on a deck 150, which can be elevated in the frame 110.

The loading unit 140 comprises a loading motor 141, a pinion 142, and a cam (not shown), wherein the pinion 142 is operated by the loading motor 141. In addition, the pinion 142 is engaged with a rack gear 201 formed on the tray 200 to load/unload the tray 200. The cam is operated by the loading motor 141 to elevate the deck 150.

The spindle motor 120, the optical pickup 130, and the loading unit 140 are installed on the frame 110. In addition, rails 160 are disposed on edges of the frame 110 to guide the sliding movement of the tray 200. The rails 160 comprise ribs protruding from a bottom surface of the frame 110, as shown in FIG. 4. The rails 160 can be divided into plural pieces as shown in FIG. 3, or may be formed as one long rib.

The tray 200 comprises a mounting portion 202, on which the disk is mounted, and a window 203, which is penetrated so that the optical pickup 130 can access the disk therethrough. In FIG. 4, guide recesses 210 are formed on edges of the tray 200 and are coupled to the rails 160. Predetermined tolerances between the rails 160 and the guide recesses 210 are necessary to slide the tray 200 along the rails 160. Therefore, widths (W5) of the guide recesses 210 are slightly larger than widths (W6) of the rails 160 and a distance (W7) between the guide recesses 210 is slightly larger than the distance (W8) between the rails 160. The rack gear 201, which is engaged with the pinion 142, is formed on a lower surface of the tray 200 in a sliding direction of the tray 200. The tray 200 holds the disk and/or a disk cartridge.

The optical disk drive of the present invention comprises a compression member which applies elastic force in a direction perpendicular to the sliding direction of the tray 200, on a side of the tray 200. The compression member is disposed on the frame 110 of the main body 100. The compression member is integrally formed with the frame 110 using a plastic injection molding method. Although it is not shown in FIGS. 3-7, the compression member may be fabricated by a spring steel plate or a plastic having elasticity, and coupled to the frame 110.

The compression member 190 in the present invention is integrally formed with the frame 110. In FIG. 5, the compression member 190 comprises an elastic portion 191, which extends from a side wall 112 of the frame 110, and a contact portion 192, formed on an end portion of the elastic portion 191 to contact a side surface of the tray 200. The elastic portion 191 is bent, when the tray 200 is loaded on the frame 110, to provide the tray 200 with the elastic force.

Figure 6:
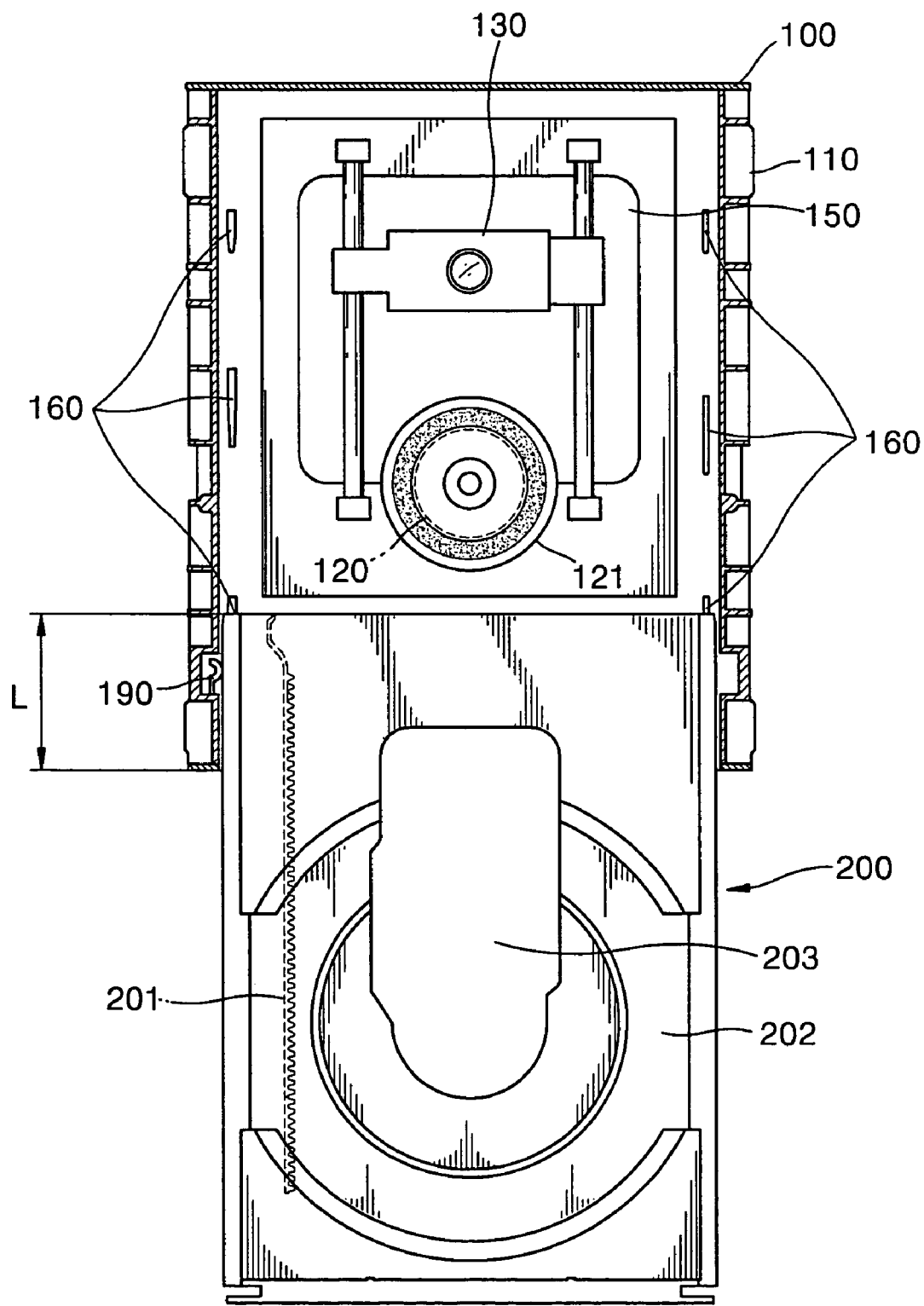
FIG. 6 is a plane view of a tray is in an unloaded state.

In FIG. 6, a contacting length (L) of the rail 160 and the guide recess 210 is the shortest when the tray 200 is in an unloaded state. Therefore, the tray 200 may vibrate due to the tolerances between the rails 160 and the guide recesses 210, when the unloading operation on the tray 200 is nearly completed or when the loading of the tray 200 starts in the unloaded state. Therefore, the compression member 190 is disposed on a front end portion of the frame 110. A plurality of compression members 190 may be disposed in the sliding direction of the tray 200, wherein an elastic force is applied to engage the pinion 142 and the rack gear 201.

When the elastic force increases, the load of the loading motor 141, which loads/unloads the disk on the tray 200 increases. Therefore, it is preferable that the elastic force is minimal to prevent the tray 200 from vibrating and to reduce the load of the loading motor 141. According to experimental results, it is preferable that the elastic force is within a range of 5-10 gf, however, the present invention is not limited thereto.

The tray 200 holds the disk and/or the disk cartridge as described above. The loading of the disk will be described as follows.

In FIG. 6, the disk is mounted on the mounting portion 202 of the tray 200 and the loading motor 141 is rotated, when the tray 200 is in an unloaded state. Then, the pinion 142 starts to rotate, and the rotating force of the pinion 142 is transmitted to the rack gear 201 to slide the tray 200 along the rails 160. Here, the spindle motor 120 and the optical pickup 130 are located on a lower side of the tray 200 in order to prevent the interference with the tray 200. When the tray 200 is being loaded, the deck 150, on which the spindle motor 120 and the optical pickup 130 are installed, is elevated by the cam (not shown), which is operated by the loading motor 141. When the loading operation is completed, the disk is mounted on the turntable 121, which is coupled to the rotary shaft of the spindle motor 120, and the optical pickup 130 is located in the window 203 to access the disk. The unloading operation of the disk can be made by performing the above process inversely.

Figure 7:
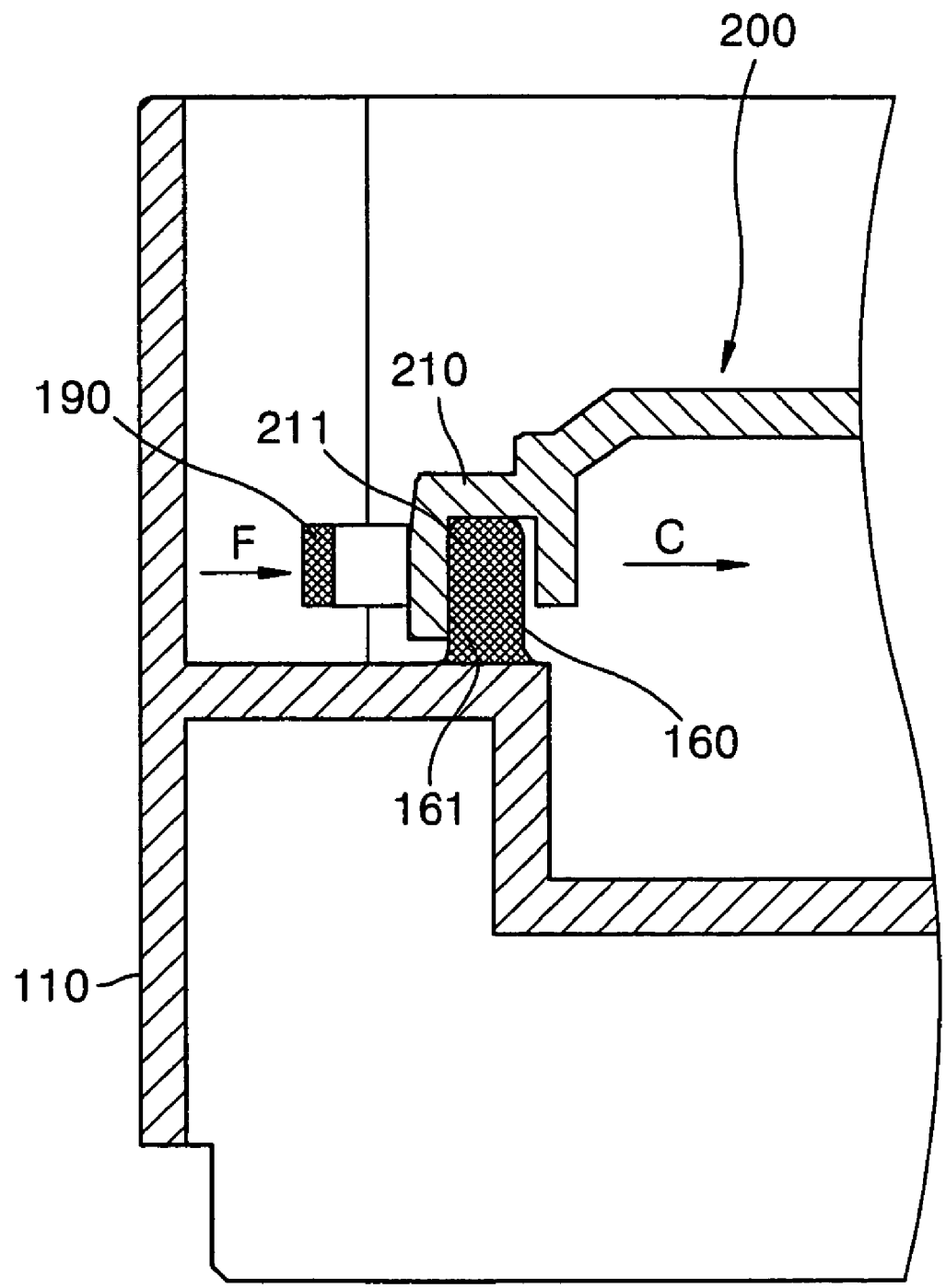
FIG. 7 is a cross-sectional view along line III-III' of FIG. 5.

In the loading/unloading processes, the compression member 190 applies the elastic force (F) to the side of the tray 200 in a direction perpendicular to a sliding direction of the tray, as shown in FIG. 7. Since tolerances exist between the rails 160 and the guide recesses 210, the tray 200 may be moved slightly in a horizontal direction (C) by the elastic force F. Then, an inner wall 211 of the guide recess 210 and a side wall 161 of the rail 160 contact each other. In addition, since the compression member 190 applies the elastic force F to the side of the tray 200, the inner wall 211 of the guide recess 210 and the side wall 161 of the rail 160 are in contact while the tray 200 is loading in the main body. The inner wall 211 of the guide recess 210 and the side wall 161 remain in contact even when the tolerance between the rail 160 and the guide recess 210 is varies according to the molding conditions when fabricating the frame 110 and the tray 200. Therefore, the tray 200 loads smoothly without vibrating.

Also, since the elastic force F is applied so that the pinion 142 and the rack gear 210 can engage with each other, the pinion 142 and the rack gear 201 can be engaged smoothly even when the tolerance between the rail 160 and the guide recess 210 is changed according to the molding conditions in fabricating the frame 110 and the tray 200.

FIG. 8 is a graph of tray vibration measurements in the optical disk drive shown in FIG. 3.

Referring to FIG. 8, two curves C1 and C2 are shown. C1 denotes vibrations of the tray 200 using the compression member 190, and C2 denotes vibrations of the tray 200 without using the compression member 190.

As described above, the tray 200 is unstable when the loading operation on the tray 200 starts, as shown in FIG. 6. In FIG. 8, part D represents the vibrations when the loading operation of the tray 200 is started. In the part D, vibration displacement of the tray 200 is approximately −0.5 mm~1.3 mm when the compression member 190 is not used (C2), and maximum amplitude is about 1.8 mm. When the compression member 190 is used (C1), the vibration displacement of the tray 200 is approximately −0.05~0.2 mm, and the maximum amplitude is approximately 0.25 mm. The maximum amplitude when the compression member 190 is used is reduced by one-seventh of the maximum amplitude when the compression member 190 is not used.

According to the optical disk drive of the present invention, the pinion and the rack gear engage smoothly regardless of the change of tolerance between the rail and the guide recess, and the tray is loaded and unloaded smoothly without vibration.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disk drive comprising:
   a frame including rails disposed on edges thereof;
   a tray installed on the frame to slide along the rails; and
   a compression member disposed on the frame to prevent vibrations of the tray when the tray slides along the rails, by applying an elastic force to the tray in a direction perpendicular to a sliding direction of the tray,
   wherein the rails comprise ribs protruding from a bottom surface of the frame.

2. An optical disk drive, comprising:
   a frame including rails disposed on edges thereof;
   a tray installed on the frame to slide along the rails, the tray comprising guide recesses formed on edges of the tray and coupled to the rails and having predetermined tolerances between the rails and the guide recesses; and
   a compression member disposed on the frame to prevent vibrations of the tray when the tray slides along the rails, by applying an elastic force to the tray in a direction perpendicular to a sliding direction of the tray, wherein widths of the guide recesses are larger than widths of the rails.

3. The optical disk drive of claim 2, wherein a distance between the guide recesses is larger than a distance between the rails.

* * * * *